Patented Dec. 12, 1922.

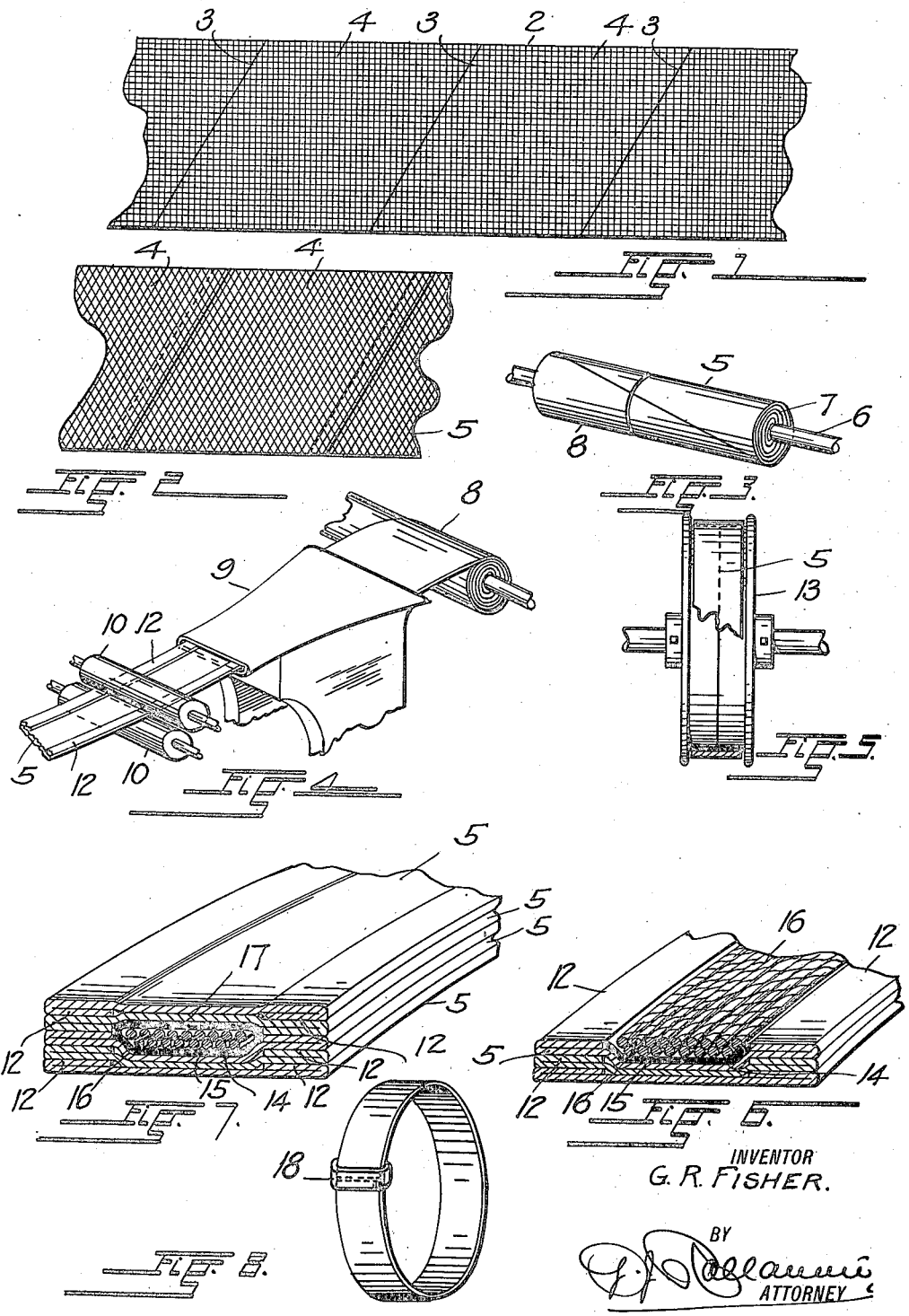

1,438,370

UNITED STATES PATENT OFFICE.

GEORGE R. FISHER, OF DENVER, COLORADO, ASSIGNOR, BY DIRECT AND MESNE ASSIGNMENTS, TO THE MASTER CORD BELT COMPANY, A CORPORATION OF COLORADO.

MACHINE BELT AND PROCESS OF MAKING THE SAME.

Application filed April 23, 1919. Serial No. 292,093.

*To all whom it may concern:*

Be it known that I, GEORGE R. FISHER, a citizen of the United States, residing at Denver, in the county of Denver and State of Colorado, have invented certain new and useful Improvements in Machine Belts and Processes of Making the Same, of which the following is a specification.

This invention relates to machine belts and the process of producing the same, and its primary object is to provide a belt of superior strength and durability which is impervious to moisture and which has sufficient elasticity to withstand the tensile action to which it is subject in operation.

My improved belt is particularly adapted for use on automobile engines to transmit the motion of the crank-shaft to the fan-wheel and for this purpose consists in its preferred form of a continuous band of the proper length and width to frictionally engage the pulley thereof.

In describing the construction of my improved belt and the method of producing the same, reference is had to the accompanying drawings in the various views of which like parts are similarly designated and in which—

Figure 1 is a plan view of a sheet of the fabric of which the belt is made, showing the oblique lines along which it is divided;

Figure 2, a plan view of the strip produced by joining the pieces of fabric into which the original sheet was divided, in end to end succession;

Figure 3 a perspective view of the strip shown in Figure 2 rolled upon a rotary core and divided into sections of determinate width;

Figure 4, a perspective view of one of the sections shown in Figure 3, relative to the mechanical devices by which the edges of the strip are folded upon themselves;

Figure 5, an elevation of the roller employed as a core in assembling the layers of which the belt is composed;

Figure 6, a sectional perspective view of a portion of the belt without its outer set of layers;

Figure 7, a sectional perspective view of a portion of the completed belt, and

Figure 8, a perspective view of the completed belt in its entirety.

The belt is composed of a plurality of layers of vulcanizable fabric, the edges of which are folded upon themselves and which are arranged in two sets placed reversely one upon the other. A core consisting of a number of windings of suitable cord is embedded between the two sets and the composite body thus produced is vulcanized to solidly connect its parts.

The layers of which the belt is composed are made of pieces of the vulcanizable fabric cut on the bias and fastened together end to end, into a strip whose threads run obliquely to the direction of its length. A limited degree of elasticity is thus obtained, which would be absent if as ordinarily, the threads of which the fabric of the strips is composed, extended parallelly and at right-angles to its longitudinal extent.

When the belt is made in the form of a continuous band, as is preferable for its use in connection with an automobile-engine, the ends of its outer and inner layers are sealed with a vulcanizable substance before vulcanization to prevent their separation from the layers upon which they are placed.

The preferred method of producing a belt of the above-described construction is as follows:

A sheet 2 of cloth impregnated with a vulcanizable compound, is cut along parallel equidistant lines 3 running obliquely across its threads as shown in Figure 1, and the pieces 4 thus obtained are fastened together by lapping their ends, to form a continuous strip 5 whose threads run obliquely to its longitudinal extent as shown in Figure 2.

The strip thus obtained is wound upon itself on a core 6 which is mounted for rotation in connection with a convenient driving element.

The roll 7 of vulcanizable fabric is subsequently divided into strips 8 of predetermined width by the use of a cutting tool fed transverse to the axis of the roll while it is being rotated at a velocity of approximately 250 revolutions per minute.

The rolled strips into which the original roll is thus divided are separately unwound and caused to pass through an appliance designated by the numeral 9 in Figure 4, which bends their edges upon themselves, and the hems thus formed are flattened by passing the strips between a pair of pressure rollers 10.

The strips of vulcanizable material are now in a condition to be assembled into a belt of the desired construction, it being understood that the vulcanizable substance with which the fabric is treated is sufficiently adhesive to cause the folded edges 12 to hold firmly together by cohesion and to cause the layers of which the belt is composed to stick together.

To make a continuous belt the strips are wound upon a flanged roller 13 which is made of two separable parts to permit of the removal of the belt when completed.

The folded edges of the inner windings of the strip face outwardly and the outer windings are reversely arranged so that between the two sets of windings an annular cavity is formed by the spaces between the folded edges to receive a core of rope or other flexible reenforcing material.

The inner set of layers, preferably three in number, produce a depression 14 between their superposed folded edges which is coated with a vulcanizable compound of the same character as that which is used to treat the original sheet, to provide an adhesive bed 15 for the cord 16 which is wound thereon in two or three superposed rows as shown in Figures 6 and 7 of the drawings.

When the entire depression has thus been filled the cord windings are secured by a covering 17 of the same vulcanizable substance after which the outer set of layers preferably two in number, are wound upon the inner set in a reverse position, i. e., with their folded edges facing inwardly.

The belt is now removed from the roller by separating the two parts thereof, and the ends of the innermost and outermost layers which are preferably arranged opposite each other, are sealed by a band 18 of suitable adhesive and vulcanizable material.

The belt is finally placed upon a cylinder and vulcanized by any suitable method, live steam being preferred.

It will be seen that a belt thus constructed has the combined strength of its several layers of fabric and its embedded core, that its hems reenforce its edges, and thus effectively resist wear by contact with the surfaces of the pulley and the flanges between which it is confined.

The inturned edges of the layers of the composite belt furthermore render the belt impervious to moisture which in belts in which the edges of the fabric are exposed, is drawn in by capillary attraction of its threads.

The fact that the threads of the fabric of which the layers are composed, run obliquely to their longitudinal extent, greatly adds to the strength of the belt and imparts thereto a limited amount of elasticity necessary for its constant frictional contact with the pulleys of the driving and driven elements of the engine, and by making the vulcanizable compound with which every part of the belt is impregnated, insoluble, the belt is made proof against the dissolving action of oil and other liquids with which it may come in contact.

Having thus described my invention what I claim and desire to secure by Letters-Patent is:

1. A machine belt comprising a vulcanized body composed of a plurality of layers each made of a strip of fabric treated with a vulcanizable substance, the threads of which run obliquely to their longitudinal extent, and the longitudinal edges of which are folded upon itself.

2. A machine belt comprising a vulcanized body composed of a plurality of layers made of strips of fabric treated with a vulcanizable substance and having their longitudinal edges folded upon themselves, the layers being arranged in two sets, the members of one of which are placed reversely with relation to those of the other, and a flexible core embedded in the cavity between the sets of layers, produced by the spaces between their folded edges.

3. A machine-belt comprising a vulcanized body composed of a plurality of layers made of strips of fabric treated with a vulcanizable substance and having their longitudinal edges folded upon themselves, the layers being arranged in two sets, the members of one of which are placed reversely with relation to those of the other, and a cord-filler embedded in the cavity between the sets of layers, produced by the spaces between their folded edges.

4. A machine-belt comprising a vulcanized body composed of a plurality of layers made of strips of fabric treated with a vulcanizable substance and having their longitudinal edges folded upon themselves, the layers being arranged in two sets, the members of one of which are placed reversely with relation to those of the other, and a cord-filler in a bed of vulcanizable substance embedded in the cavity between the sets of layers, produced by the spaces between their folded edges.

5. A machine-belt comprising a vulcanized continuous band composed of a plurality of layers made of strips of fabric treated with a vulcanizable substance and having their longitudinal edges folded upon themselves, the layers being arranged in an inner set the folded edges of which face outwardly and an outer set the folded edges of which face inwardly, and a flexible core in the cavity between the sets of layers produced by the spaces between their folded edges.

6. The process of making machine belts consisting in winding a sheet of fabric treated with a vulcanizable substance, upon itself, cutting the roll thus produced into sections, of determinate width, folding the longitudinal edges of the strip of which each section is composed, upon themselves, placing this strip in layers one upon another and vulcanizing the composite body thus produced.

7. The process of making machine belts consisting in folding the longitudinal edges of a strip of fabric treated with a vulcanizable substance upon themselves, placing the strip in layers one upon another with their folded edges facing upwardly, placing a flexible core upon the upper layer in the cavity produced by the spaces between the folded edges of the layers, covering the layers by other layers having their folded edges facing downwardly, and vulcanizing the composite body thus produced.

8. The process of making machine belts consisting in folding the longitudinal edges of a strip of fabric treated with a vulcanizable substance upon themselves, placing the strip in layers one upon another with their folded edges facing upwardly, placing a bed of vulcanizable substance upon the upper layer in the cavity produced by the spaces between the folded edges of the layers, placing a flexible core in said bed, covering the layers by other layers having their folded edges facing downwardly, and vulcanizing the composite body thus produced.

9. The process of making machine belts consisting in winding a sheet of fabric treated with a vulcanizable substance, the threads of which run obliquely to its longitudinal extent, upon itself, cutting the roll thus produced into sections of determinate width, folding the longitudinal edges of the strip of which each section is composed, upon themselves, placing this strip in layers one upon another and vulcanizing the composite body thus produced.

10. The process of making machine belts consisting in folding the longitudinal edges of a strip of fabric treated with a vulcanizable substance, upon themselves, winding the strip upon itself with its folded edges facing upwardly, in a plurality of layers, placing a flexible core upon the upper layer in the cavity produced by the spaces between the folded edges of the layers, winding a similar strip in a plurality of layers upon the first-mentioned strip with its folded edges facing downwardly, and vulcanizing the continuous band thus produced.

11. The process of making machine belts consisting in folding the longitudinal edges of a strip of fabric treated with a vulcanizable substance, upon themselves, winding the strip upon itself with its folded edges facing upwardly, in a plurality of layers, winding a cord upon the upper layer in the cavity produced by the spaces between the folded edges of the layers, winding a similar strip in a plurality of layers upon the first-mentioned strip with its folded edges facing downwardly, and vulcanizing the continuous band thus produced.

12. The process of making machine belts consisting in folding the longitudinal edges of a strip of fabric treated with a vulcanizable substance, upon themselves, winding the strip upon itself with its folded edges facing upwardly, in a plurality of layers, placing a bed of vulcanizable substance upon the upper layer in the cavity produced by the spaces between the folded edges of the layers, winding a cord upon said bed, covering the windings of the cord with a vulcanizable substance, winding a similar strip in a plurality of layers upon the first-mentioned strip with its folded edges facing downwardly, and vulcanizing the continuous band thus produced.

13. The process of making machine belts consisting in folding the longitudinal edges of a strip of fabric treated with a vulcanizable substance, upon themselves, winding the strip upon itself with its folded edges facing upwardly in a plurality of layers, placing a flexible core upon the upper layer in the cavity produced by the spaces between the folded edges of the layers, winding a similar strip in a plurality of layers upon the first-mentioned strip with its folded edges facing downwardly, covering the ends of the inner and outer layers with a vulcanizable seal, and vulcanizing the continuous band thus produced.

14. The process of making machine belts consisting in cutting a sheet of fabric treated with a vulcanizable substance, the threads of which run obliquely to its longitudinal extent, into strips of determinate width, folding the longitudinal edges of the strips upon themselves, winding the folded strip upon itself with its folded edges facing upwardly in a plurality of layers, placing a flexible core upon the upper layer between its said edges, winding a similar strip in a plurality of layers upon the first-mentioned strip with its folded edges facing downwardly, and vulcanizing the continuous band thus produced.

15. A machine belt composed of plies greater in number at the edges than in the center thereof, said plies being arranged to form an interior space, and a flexible core in said space.

16. A machine belt comprised of a plurality of layers the edge portions of each of which are folded upon themselves in spaced relation to each other whereby the total thickness of the belt is greater at the edges than in the center thereof.

In testimony whereof I have affixed my signature.

GEORGE R. FISHER.